United States Patent
Eng

(10) Patent No.: US 7,536,356 B2
(45) Date of Patent: *May 19, 2009

(54) DISTRIBUTED RUN-TIME LICENSING

(75) Inventor: May D. Eng, Liberty Corner, NJ (US)

(73) Assignee: BEA Systems, Inc., Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/973,226

(22) Filed: Oct. 26, 2004

(65) Prior Publication Data

US 2005/0086174 A1    Apr. 21, 2005

Related U.S. Application Data

(62) Division of application No. 09/854,163, filed on May 11, 2001, now Pat. No. 7,359,882.

(51) Int. Cl.
*G06Q 99/00* (2006.01)

(52) U.S. Cl. ............... 705/59; 705/51; 705/53; 705/54; 705/64; 707/8; 726/26

(58) Field of Classification Search ............ 705/8, 705/50–79; 726/22–32; 709/203, 223, 224; 717/177; 707/8
See application file for complete search history.

(56) References Cited

U.S. PATENT DOCUMENTS

| | | | |
|---|---|---|---|
| 4,511,969 A * | 4/1985 | Koenig et al. | 379/90.01 |
| 4,937,863 A | 6/1990 | Robert et al. | 380/4 |
| 5,023,907 A | 6/1991 | Johnson et al. | |
| 5,329,579 A * | 7/1994 | Brunson | 379/88.26 |
| 5,343,526 A | 8/1994 | Lassers | 380/4 |
| 5,438,508 A | 8/1995 | Wyman | 364/401 |
| 5,579,222 A | 11/1996 | Bains et al. | 395/12 |
| 5,671,279 A | 9/1997 | Elgamal | |
| 5,671,285 A | 9/1997 | Newman | |

(Continued)

FOREIGN PATENT DOCUMENTS

EP    0 852 349 A20    8/1998

OTHER PUBLICATIONS

Cohen, et al., "General Event Notification Architecture Base: Client to Arbiter," Internet Draft, http://www.upnp.org/download/draft-cohen-gena-client-01.txt, Sep. 6, 2000, pp. 1-14.

(Continued)

*Primary Examiner*—Andrew J. Fischer
*Assistant Examiner*—Jacob C Coppola
(74) *Attorney, Agent, or Firm*—Fliesler Meyer LLP

(57) ABSTRACT

Methods and systems are disclosed for managing software licenses in a distributed computer network. The number of software licenses allocated to software users can be determined on a node-by-node basis in realtime with little or no additional processing overhead incurred by the network. Upon of the occurrence of a node failure, software licenses are efficiently reallocated to new users. In one implementation, users are periodically counted at each network node and transmitted to a master node with a sanity scan result message. A license allocation condition is periodically evaluated using the sum of the counts. If the condition is met, a license lockout can be performed upon the expiration of a grace period.

26 Claims, 15 Drawing Sheets

U.S. PATENT DOCUMENTS

| | | | |
|---|---|---|---|
| 5,673,315 | A | 9/1997 | Wolf |
| 5,758,068 | A | 5/1998 | Brandt et al. |
| 5,790,664 | A | 8/1998 | Coley et al. ............... 380/4 |
| 5,940,504 | A | 8/1999 | Griswold |
| 6,009,173 | A | 12/1999 | Sumner |
| 6,014,688 | A | 1/2000 | Venkatraman et al. |
| 6,029,145 | A | 2/2000 | Barritz et al. |
| 6,055,413 | A | 4/2000 | Morse et al. |
| 6,056,786 | A | 5/2000 | Rivera et al. ............ 795/712 |
| 6,189,146 | B1 | 2/2001 | Misra et al. ............... 717/11 |
| 6,324,578 | B1 | 11/2001 | Cox et al. ................. 709/223 |
| 6,446,136 | B1 | 9/2002 | Pohlmann et al. |
| 6,453,305 | B1 | 9/2002 | Glassman et al. ........... 705/59 |
| 6,609,128 | B1 | 8/2003 | Underwood |
| 6,640,244 | B1 | 10/2003 | Bowman-Amuah |
| 6,691,175 | B1 | 2/2004 | Lodrige et al. |
| 6,760,752 | B1 | 7/2004 | Liu et al. |
| 6,766,305 | B1 | 7/2004 | Fucarile et al. |
| 6,917,976 | B1 | 7/2005 | Slaughter et al. |
| 7,143,093 | B1 | 11/2006 | Bracho et al. |
| 7,234,103 | B1 | 6/2007 | Regan |
| 7,359,882 | B2 * | 4/2008 | Eng ......................... 705/59 |
| 2002/0065780 | A1 | 5/2002 | Barritz et al. |

OTHER PUBLICATIONS

"Statement of Position 97.2—Software Revenue Recognition", Journal of Accountancy, vol. 185, No. 1, Jan. 1998, 14 pages.

BEA Systems, Inc., "Description of BEA Tuxedo Release 7.1", retrieved from URL <http://edocs.bea.com/tuxedo/tux71/html/dvlibra7.htm>, on Aug. 23, 2007, 5 pages.

* cited by examiner

— 106

[SOFTWARENAME]

VERSION=1.1

LICENSEE=LICENSEENAME

SERIAL=123456789

ORDERID=Internal

USERS=200000

TYPE=SDK

DEVELOPERS=100000

EXPIRATION=2005-02-20

SIGNATURE=JD3fji6jiWubi8Uehin7WqpbnzX
eng5hjryptlQEw6bNvoepNfple6w3fpyrGoz

Fig. 9

DISTRIBUTED RUN-TIME LICENSING

CLAIM OF PRIORITY

This application is a divisional of U.S. patent application Ser. No. 09/854,163 entitled "Distributed Run-Time Licensing", filed May 11, 2001 now U.S. Pat. No. 7,359,882.

BACKGROUND OF THE INVENTION

The present invention is directed to technology for licensing software.

In modern computing environments, software programs are often accessed by multiple users distributed across many nodes of computer networks. Multiple instances of a given software program may run on various nodes of the network simultaneously with each node providing simultaneous access to the software program by multiple users.

Software programs capable of such access typically limit the number of simultaneous users through software licensing. Users seeking to access licensed software must be allocated a valid user license in order to interact with the software. If an insufficient number of licenses are available, additional users will be unable to access the licensed software once all available licenses are exhausted. Although administrators can purchase additional licenses for a given software program, it can be prohibitively expensive for administrators to provide an unlimited number of software licenses.

As a result, various licensing management software packages are available which allow administrators to allocate, monitor, and deallocate software licenses. However, certain prior art licensing management software requires administrators to accept trade-offs between the availability of realtime management of software licenses, and additional processing overhead incurred by such realtime management. This overhead introduces inefficiencies that can quickly reach unacceptable levels, especially during network traffic peaks.

Other prior art approaches merely estimate a number of user licenses in use at a single point in time, such as during the boot time of the licensing management software. Although such approaches may incur less realtime processing overhead, they nevertheless fail to provide an accurate realtime count of the number of licenses actually in use. FIG. 1 provides a flow chart 10 of one such prior art method. At step 12, licensing management software is booted. At boot time, the licensing management software estimates the number of users currently accessing the licensed software (step 14). This estimation may be based on a configuration file of the particular software program to be licensed. At step 16, the licensing management software determines the total number of licenses available system-wide for the licensed software. At step 18, an additional number of failover licenses are added to the total licenses determined in step 16. In step 20, a portion of the total licenses are allocated to the users estimated in step 14. In step 22, additional user licenses beyond those all already allocated during step 20 are further allocated to additional users as they attempt to access the licensed software, until a maximum number of licenses have been allocated equal to the sum of the total licenses determined in step 16 and the failover licenses determined in step 18.

In real world situations, the number of users attempting to access licensed software can change dramatically over time. For example, software applications used in the processing of Automated Teller Machine transactions may experience a high traffic volume during the noon lunch hour, but much lower traffic during the early morning. In such a scenario, an estimate of the number of users made at a given point in time, such as in step 14 of FIG. 1, will not necessarily be an accurate estimate of the number of users at other times of the day. If the estimate of step 14 is inaccurate, then the number of licenses available for allocation will not necessarily be representative of the actual number of available licenses. In the example above, a user seeking to access an Automated Teller Machine during peak traffic periods may receive a notification that a bank's computer system does not have enough software licenses to access the user's bank account. Such a situation is unacceptable for both consumers as well as businesses relying on realtime access to licensed software running on the Automated Teller Machine.

The prior art method of FIG. 1 also fails to allocate licenses efficiently in response to failover situations. For example, if a node of a distributed computer network fails, the prior art technique of FIG. 1 provides no way to deallocate licenses previously allocated to the failed node. Licenses from the failed node are "lost" to the failed node and not reallocated among the remaining functional nodes. All users across the network are effectively "locked out" from using licenses that have been paid for, but are nevertheless lost to the failed node.

The method of FIG. 1 provides for the allocation of additional "failover licenses" in step 18 in an attempt to minimize these effects. The failover licenses are extra licenses that can be allocated to users of properly functioning nodes in order to compensate for the loss of any licenses in use at a failed node. However, since system administrators are unable to predict which nodes will fail or when they will fail, the number of failover licenses determined in step 18 is merely an estimate. If administrators provide enough failover licenses to handle a single node failure, an additional node failure may still exhaust all available failover licenses. In such a scenario, users remain locked out of the licenses allocated to a first failed node, as well as all failover licenses allocated to a second failed node. Clearly, prior art licensing management software fails to efficiently allocate, monitor, or deallocate software licenses, or effectively address the problems caused by failover conditions.

SUMMARY OF THE INTENTION

The present invention, roughly described, provides methods and systems that can be used to manage software licenses in a distributed computer network at run-time. In one embodiment, the present invention provides for the realtime determination of a number of software licenses allocated to software users at a plurality of nodes. In an alternative embodiment, this realtime determination can be performed with little additional processing overhead to the network. In yet another embodiment, software licenses are efficiently reallocated to new users upon the occurrence of failover conditions.

One implementation of the present invention includes the step of periodically counting users of a software program at a plurality of nodes of a computer network to obtain counts of software licenses in use by each node. The user counts are periodically transmitted to a master node where they are summed to obtain a total number of software users on the network. A license allocation condition is periodically evaluated using the total number of users to obtain a license allocation result. If the result indicates that the license allocation condition is met, a suitable response is performed. In one embodiment, this response comprises the steps of measuring a license grace period and initiating a license lockout if the grace period is exhausted. In another embodiment, a sanity scan is performed on at least a subset of nodes and a scan result message is generated. The scan result message can transmitted to the master node with the user counts.

The present invention can be implemented using hardware, software, or a combination of both hardware and software. The software used for the present invention is stored on one or more processor readable storage devices including hard disk drives, CD-ROMs, optical disks, floppy disks, tape drives, RAM, ROM, or other suitable storage devices. In alternative embodiments, some or all of the software can be replaced by dedicated hardware including custom integrated circuits, gate arrays, FPGAs, PLDs, and special purpose computers. Hardware that can be used for the present invention includes computers, handheld devices, telephones (e.g. cellular, Internet enabled, digital, analog, hybrids, and others), and other hardware known in the art. Some of these devices include processors, memory, nonvolatile storage, input devices, and output devices.

These and other advantages of the present invention will appear more clearly from the following description in which the preferred embodiment of the invention has been set forth in conjunction with the drawings.

BRIEF DESCRIPTION OF THE DRAWINGS

FIG. 9 illustrates the format of an exemplar license file.

DETAILED DESCRIPTION

Figure 1:
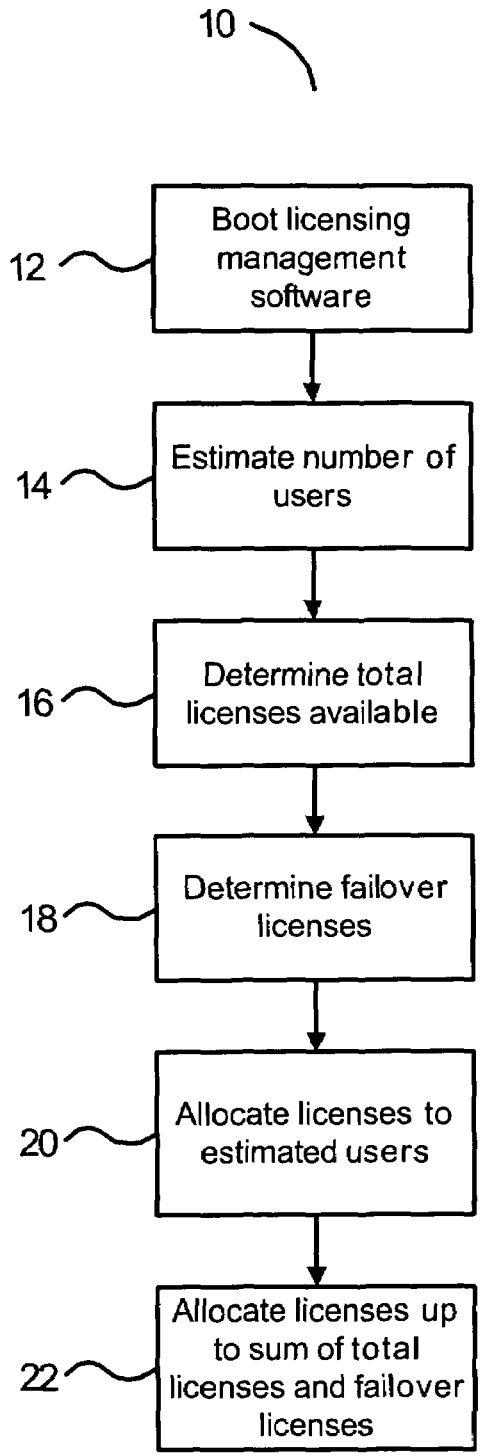
FIG. 1 is a flow chart describing a prior art process for counting licenses.
Figure 2:
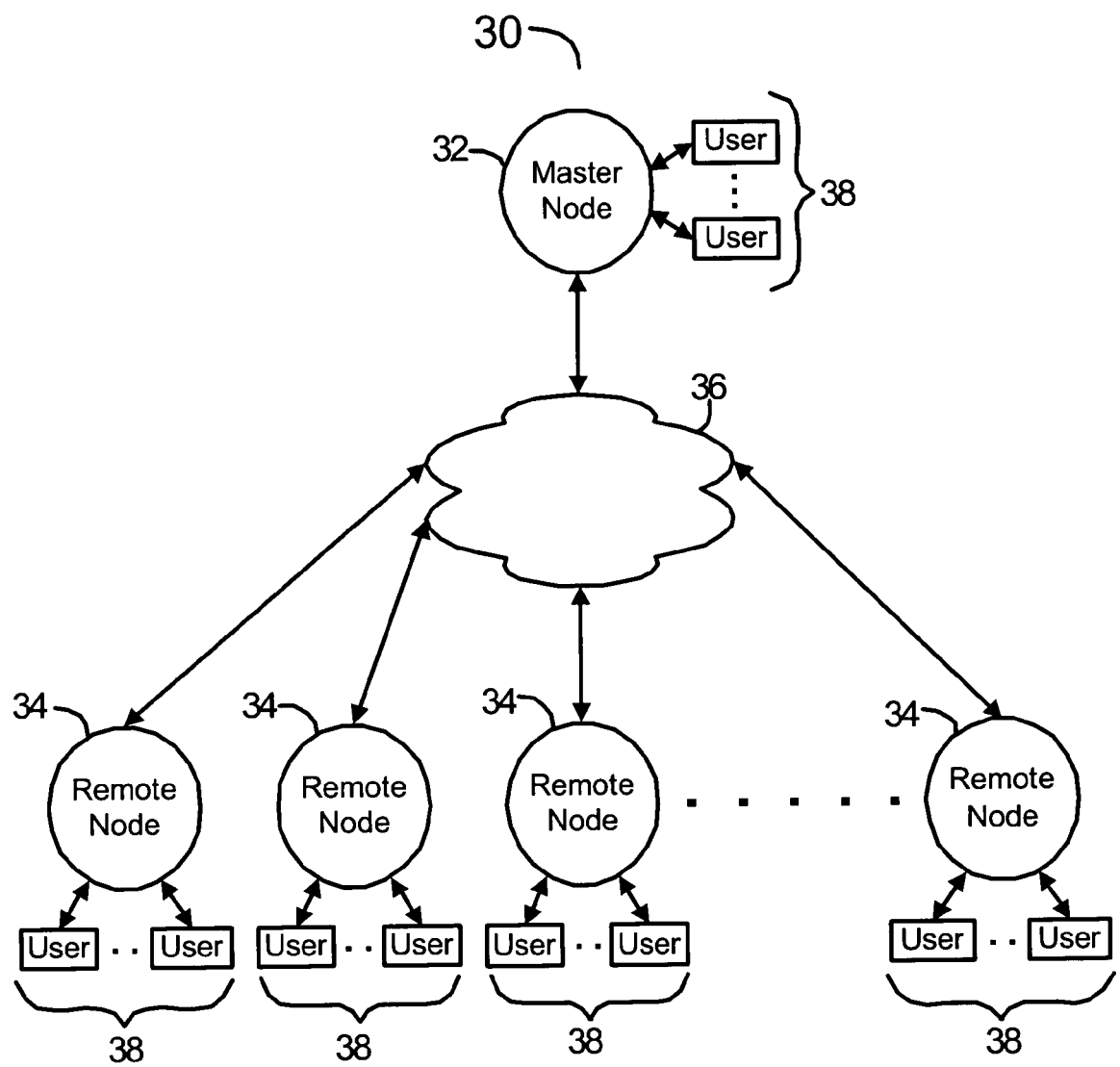
FIG. 2 is a block diagram of a distributed computer network comprising multiple nodes.

FIG. 2 provides a block diagram 30 of a distributed computer network system comprising multiple nodes which can be used in accordance with the present invention. A plurality of nodes 32 and 34 are coupled to network 36. In one embodiment, a node is designated the master node 32. The remaining nodes are designated remote nodes 34. All nodes are in data communication with the other nodes of the network through communication software known in the art. Nodes 32 and 34 can be coupled to the network using any networking hardware known in the art. This hardware can include, but is not limited to: bridges, routers, hubs, or other hardware. Network communication can take place over any combination of electrical, optical, wireless, or other mediums.

Although a plurality of nodes 32 and 34 are illustrated in FIG. 2, the present invention can be scaled for use with computing environments having any number of nodes in any desired distribution. In one embodiment, the present invention is implemented on a single node comprising a single server, while other embodiments implement the present invention across a plurality of nodes employing a wide range of computer systems as further described herein.

A plurality of users 38 can access the master node 32 and remote nodes 34. In accordance with the present invention, users 38 can be any physical or virtual entities that seek to interact with software licensed in accordance with the present invention. Possible users include, but are not limited to: human beings, application software, operating systems, middleware, network protocols, other nodes of system 30, individual software threads, and other software or hardware. As will be apparent to those skilled in the art, many types of physical and virtual entities beyond those described above can be viewed as users in accordance with the present invention. In one embodiment, a maximum of 10,000,000 users can access a software program licensed in accordance with the present invention.

Each remote node 34 periodically counts the number of users 38 currently accessing licensed software on the remote mode 34. In one embodiment, this count is performed during a sanity scan on a remote node. The remote node user counts are periodically transmitted to master node 32. In one embodiment, these transmissions are asynchronous. Master node 32 periodically sums the user counts received from the remote nodes 34 in order to determine a total number of users using the licensed software on system 30. This total indicates the number of software licenses currently in use by users 38 on system 30. In one embodiment, user licenses are automatically allocated to new users 38 after they log in, are counted, and included in the total number of users. As further described herein, processes running on the master node 32 can initiate appropriate actions depending on the total number of users counted (which represents the number of software licenses required), the total number of licenses available to all network users, and whether a remote node 38 fails to transmit a count. These actions include, but are not limited to: issuing messages, displaying messages, initiating license lockouts in order to prevent additional software licenses from being allocated, terminating license lockouts, initiating grace periods, and other actions including those further described herein.

Although a preferred embodiment of the present invention is described herein in relation to a CORBA-based implementation of BEA TUXEDO® version 7.1 available from BEA Systems, Inc., of San Jose, Calif., it will be appreciated by those skilled in the art that the present invention can be implemented in accordance with many types of transaction processing monitoring software, middleware, applications, operating systems, and other software and hardware combinations known in the art.

Figure 3:
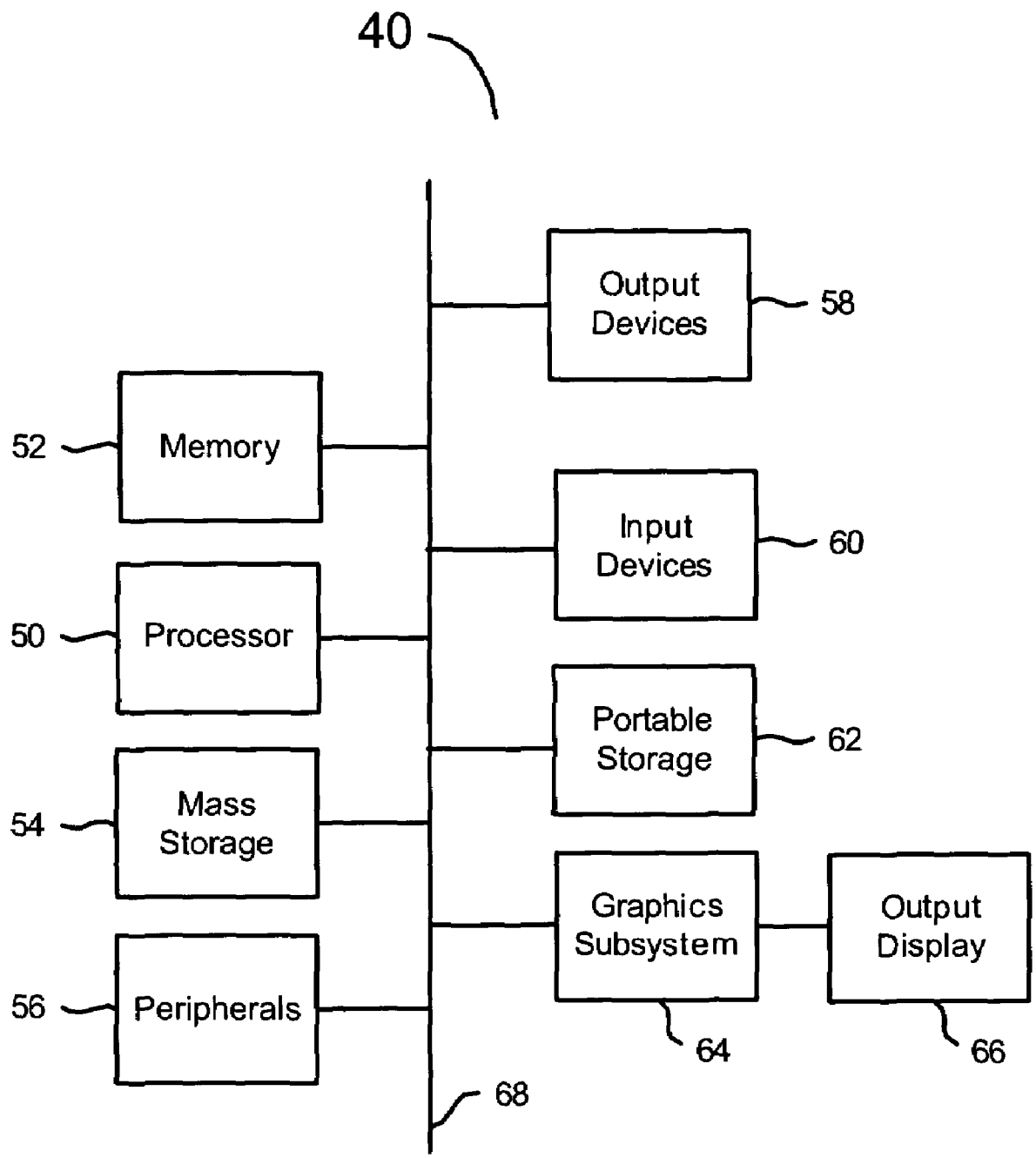
FIG. 3 is a block diagram depicting the components of a computing system that can be used with the present invention.

FIG. 3 illustrates a block diagram 40 of a computer system which can be used for the components of the present invention. The computer system of FIG. 3 includes a processor unit 50 and main memory 52. Processor unit 50 may contain a single microprocessor, or may contain a plurality of microprocessors for configuring the computer system as a multiprocessor system. Main memory 52 stores, in part, instructions and data for execution by processor unit 50. If the present invention is wholly or partially implemented in software, main memory 52 can store the executable code when in operation. Main memory 52 may include banks of dynamic random access memory (DRAM), high speed cache memory, as well as other types of memory known in the art.

The system of FIG. 3 further includes a mass storage device 54, peripheral devices 56, user input devices 60, portable storage medium drives 62, a graphics subsystem 64, and an output display 66. For purposes of simplicity, the components shown in FIG. 3 are depicted as being connected via a single bus 68. However, as will be apparent to those skilled in the art, the components may be connected through one or more data transport means. For example, processor unit 50 and main memory 52 may be connected via a local microprocessor bus, and the mass storage device 54, peripheral devices 56, portable storage medium drives 62, and graphics subsystem 64 may be connected via one or more input/output (I/O) buses. Mass storage device 54, which may be implemented with a magnetic disk drive, optical disk drive, as well as other drives known in the art, is a non-volatile storage device for storing data and instructions for use by processor unit 50. In one embodiment, mass storage device 54 stores software for implementing the present invention for purposes of loading to main memory 52.

Portable storage medium drive 62 operates in conjunction with a portable non-volatile storage medium, such as a floppy disk, to input and output data and code to and from the computer system of FIG. 3. In one embodiment, the system software for implementing the present invention is stored on such a portable medium, and is input to the computer system via the portable storage medium drive 62. Peripheral devices 56 may include any type of computer support device, such as an input/output (I/O) interface, to add additional functionality to the computer system. For example, peripheral devices 56 may include a network interface for connecting the computer system to a network, as well as other networking hardware such as modems, routers, or other hardware known in the art.

User input devices 60 provide a portion of a user interface. User input devices 60 may include an alpha-numeric keypad for inputting alpha-numeric and other information, or a pointing device, such as a mouse, a trackball, stylus, or cursor direction keys. In order to display textual and graphical information, the computer system of FIG. 3 includes graphics subsystem 64 and output display 66. Output display 66 may include a cathode ray tube (CRT) display, liquid crystal display (LCD) or other suitable display device. Graphics subsystem 64 receives textual and graphical information, and processes the information for output to display 66. Additionally, the system of FIG. 3 includes output devices 58. Examples of suitable output devices include speakers, printers, network interfaces, monitors, and other output devices known in the art.

The components contained in the computer system of FIG. 3 are those typically found in computer systems suitable for use with certain embodiments of the present invention, and are intended to represent a broad category of such computer components known in the art. Thus, the computer system of FIG. 3 can be a personal computer, workstation, server, minicomputer, mainframe computer, or any other computing device. Computer system 40 can also incorporate different bus configurations, networked platforms, multi-processor platforms, etc. Various operating systems can be used including Unix, Linux, Windows, Macintosh OS, Palm OS, and other suitable operating systems.

As will be appreciated by those skilled in the art, the components of computer system 40 can comprise all or parts of any of the components of block diagram 30 including master node 32 as well as any of remote nodes 34. It will also be appreciated that any of nodes 32 and 34 of FIG. 2 can comprise multiple computer systems, such as multiples of computer system 40 depicted in FIG. 3.

Figure 4:
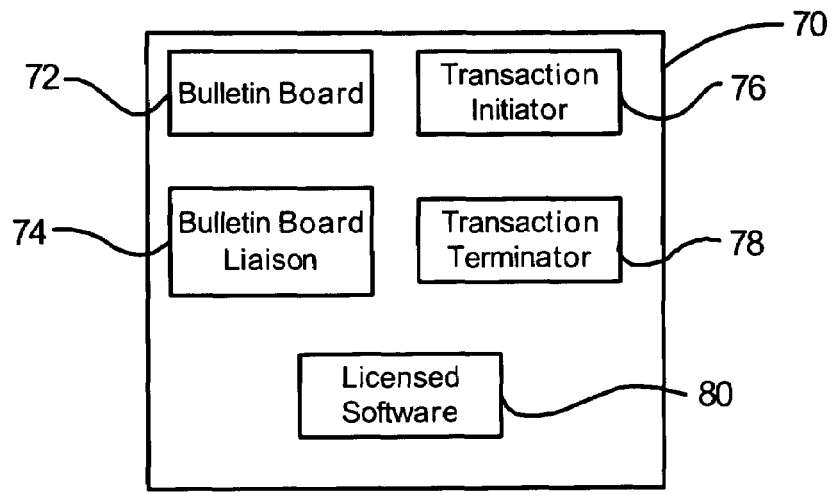
FIG. 4 is a block diagram depicting components residing in memory of a remote node of a distributed computer network.
Figure 5:
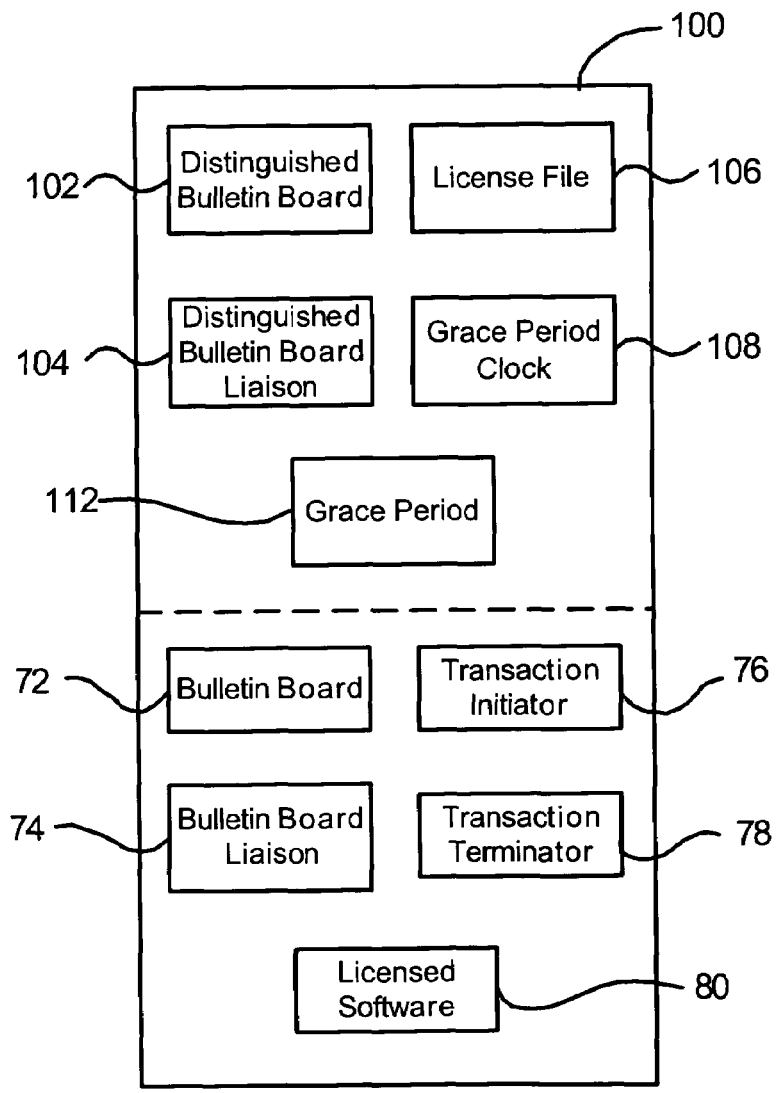
FIG. 5 is a block diagram depicting components residing in memory of a master node of a distributed computer network.

FIGS. 4 and 5 illustrate subsets of data accessible by nodes of system 30, as well as processes running on the nodes for performing steps of methods in accordance with the present invention. FIG. 4 provides a block diagram 70 depicting components residing in memory of a remote node 34. Bulletin Board 72 ("BB") is a shared memory accessible by processes running on a remote node 34. Bulletin Board Liaison 74 ("BBL") is a process running on remote node 34 responsible for passing information between BB 72 and components of system 30. BBL 74 can also perform a plurality of processes in accordance with the present invention as further described herein. Transaction initiator 76 is a process running on remote node 34 responsible for initiating a user login as further described herein. Transaction terminator 78 is a process running on remote node 34 responsible for terminating a user logout as further described herein. Licensed software 80 is software licensed in accordance with the present invention running on a remote node 34 that is accessed by users 38. In one embodiment, licensed software 80 is at least one component of BEA TUXEDOä version 7.1.

FIG. 5 is a block diagram 100 depicting components residing in memory of a master node 32 of a system 30. Distinguished Bulletin Board ("DBB") 102 is a shared memory accessible by processes running on master node 32. Distinguished Bulletin Board Liaison ("DBBL") 104 is a process running on master node 32 responsible for passing information between DBB 102 and components of system 30. License file 106 contains information describing the licenses available to system 30 for licensed software 80, as further described herein. Grace period clock 108 is a process which measures time elapsed since an error threshold was reached and is used to determine when a grace period has expired as further described herein. Grace period 112 stores the value of a maximum length of time that an error condition can be met before a license lockout is initiated as further described herein. In one embodiment, grace period 112 is set to a value of 24 hours.

As further illustrated in FIG. 5, master node 32 can also comprise components 72, 74, 76, 78, and 80 previously described above. This allows master node 32 to also operate as a remote node. It will be appreciated that these remote node components are not required to be present in master node 32, but can be present in order to provide master node 32 with the functionality of remote nodes 34.

The set of components depicted in FIGS. 4 and 5 is not intended to be exhaustive. It is well within the scope and contemplation of the present invention that master node 32 and remote nodes 34 can comprise additional components including processes, data, and other components not directly discussed herein. As will be appreciated by those skilled in the art, the components of FIGS. 4 and 5 can reside in any combination of memories such as random access memory, mass storage, portable storage, various components of FIG. 3, as well as any storage or memory means known in the art.

Figure 6:
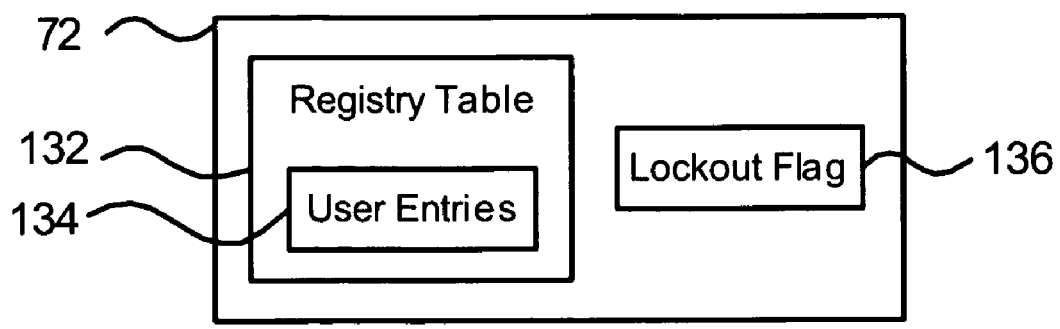
FIG. 6 is a block diagram depicting data components stored in a bulletin board of a remote node.

FIG. 6 is a block diagram depicting data components stored in BB 72 of a remote node 34. Registry table 132 stores user entries 134 which are entered and deleted as user licenses are allocated and deallocated, as further described herein. Lockout flag 136 is set in response to the initiation of a license lockout, as further described herein.

Figure 7:
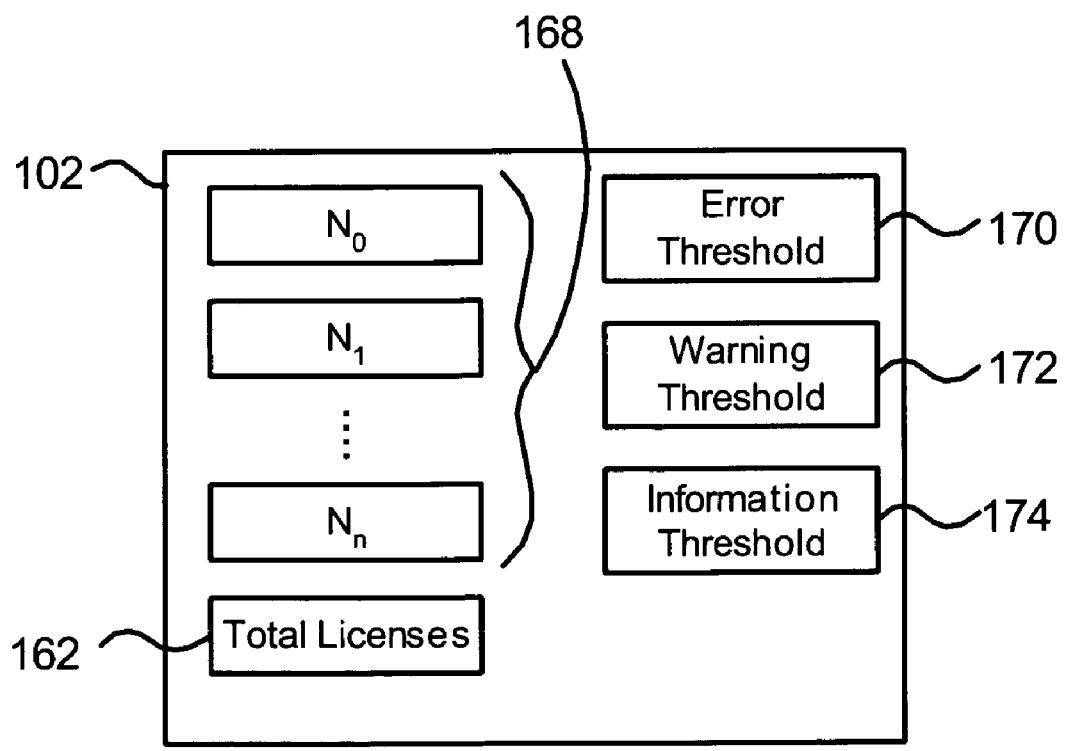
FIG. 7 is a block diagram depicting data components stored in a distinguished bulletin board of a master node.

FIG. 7 is a block diagram depicting data components in DBB 102 of master node 32. Total licenses 162 is a maximum number of user licenses available to users of system 30 for accessing licensed software 80. Accordingly, total licenses 162 can include licenses already allocated to users, as well as licenses not yet allocated to users. In one embodiment, total licenses 162 is a system-wide parameter that does not vary with the number of nodes 32 and 34 running licensed software 80. In another embodiment, total licenses 162 equals the number of licenses purchased by an administrator. $N_0$, $N_1, \ldots, N_n$ 168, are counts of users made at each of remote nodes 34. Error threshold 170 is a variable used to determine whether too many licenses have been allocated across system 30. Warning threshold 172 is a variable used to determine whether all of total licenses 162 have been exhausted. Information threshold 174 is a variable used to determine whether enough licenses have been allocated across system 30 to pose a substantial risk that all of total licenses 162 will be exhausted. In one embodiment, thresholds 170, 172, and 174 can be employed as license allocation conditions that are evaluated by DBBL 104.

Figure 8:
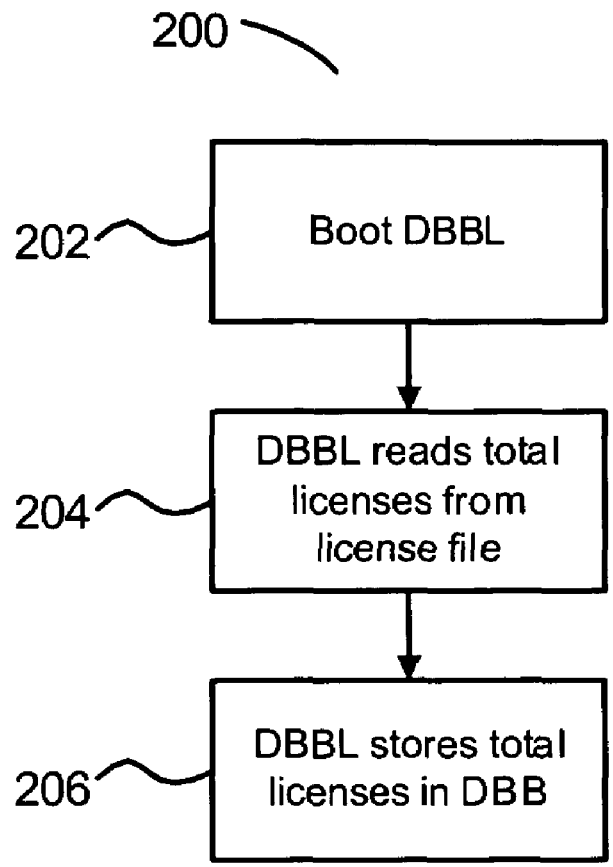
FIG. 8 is a flow chart describing a process for determining a total number of licenses in a distributed computer network.

FIG. 8 provides a flow chart 200 describing a process for determining total licenses 162. In one embodiment, the steps of FIG. 8 are performed by DBBL 104. At step 202, DBBL 104 on master node 32 is booted. In one embodiment, master node 32 is booted before nodes 34 are booted. At boot time, DBBL 104 accesses license file 106 and reads the total number of user licenses available across system 30 (step 204). DBBL 104 stores this data as total licenses 162 in DBB 102 (step 206).

FIG. 9 illustrates the format of an exemplar license file 106. In one embodiment, license file 106 is an ASCII file. License file 106 comprises the name and version number of the licensed software, name of the licensee, serial number, orderid, number of users, type, number of developers, expiration date of the licenses, and a digital signature. In the example of FIG. 9, software entitled SOFTWARENAME version 1.1 is licensed to LICENSEENAME. The license file 106 has a serial number of 123456789. The orderid identifies the entity requesting license file 106. In the example of FIG. 9, an internal user requests the license file. The license file provides for 200,000 total user licenses and 100,000 total developer licenses system-wide. It will be appreciated that developer licenses can be managed in accordance with the present invention as described herein with respect to user licenses. The type parameter indicates whether the license file 106 is part of a software developer's kit or a run-time kit. In the example of FIG. 9, a software developer's kit (SDK) is specified. The expiration parameter indicates when licenses provided by license file 106 expire. In the sample of FIG. 9, the licenses expire on Feb. 20, 2005. A digital signature is provided which prevents administrators from tampering with the number of user and developer licenses specified by license file 106. In one embodiment, the digital signature is derived using parameters contained in the license file 106. In another embodiment, a subset of the components illustrated in FIG. 9 comprise license file 106.

Figure 10:
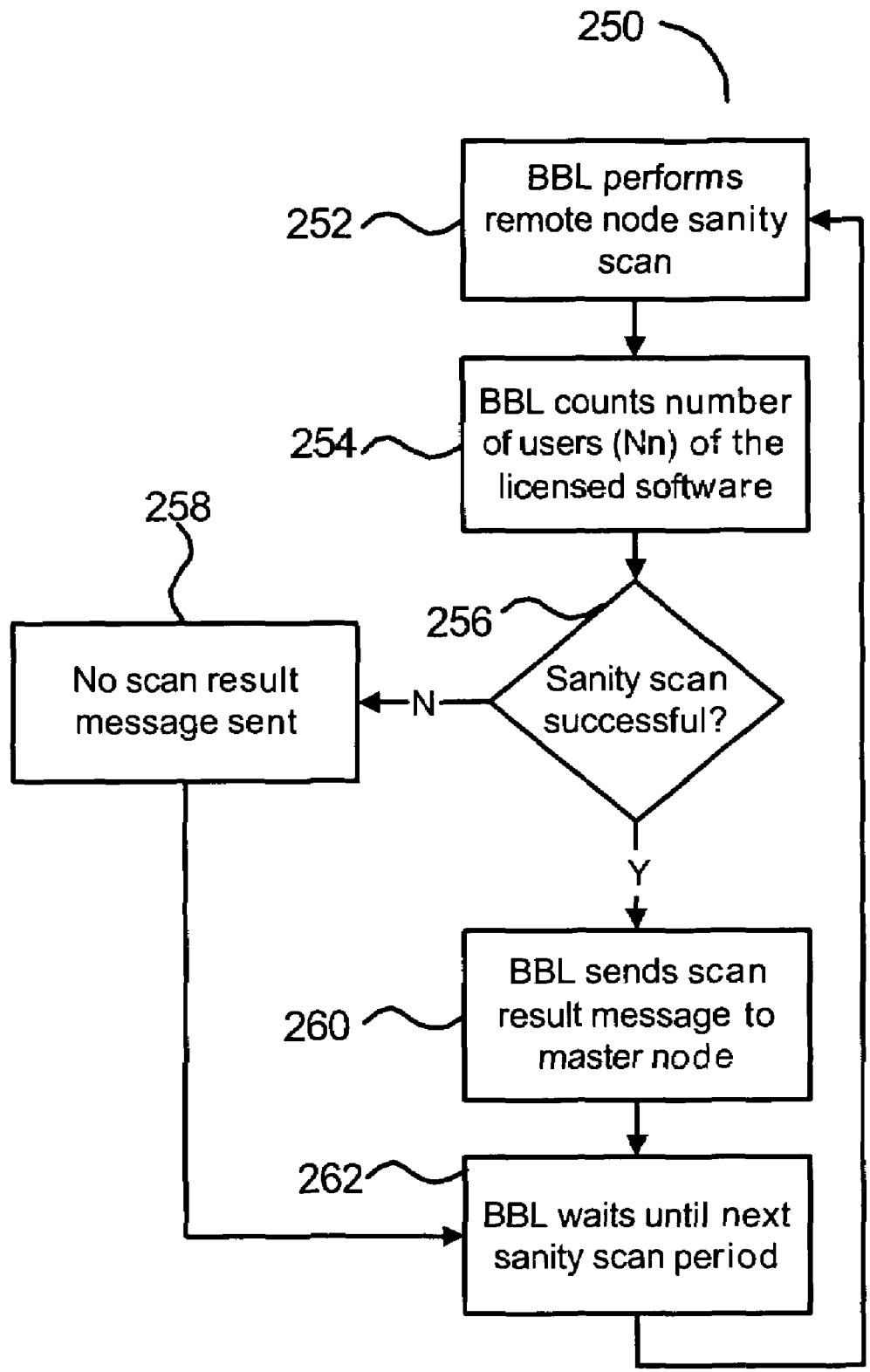
FIG. 10 is a flow chart describing a process for determining a number of licenses allocated to users of licensed software on a remote node.

FIG. 10 provides a flow chart 250 describing a process for determining a number of licenses allocated to users 38 of licensed software 80 running on a remote node 34. In one embodiment, the steps of FIG. 10 are performed by BBL 74. In step 252, BBL 74 performs a periodic sanity scan on remote node 34. This sanity scan detects any failed, locked, partially inoperative, or completely inoperative processes running on the remote node 34 as well as the status of transactions between remote node 34 and other nodes. In one embodiment, sanity scans are performed at two minute intervals. In another embodiment, sanity scans are performed at intervals specified by an administrator. In yet another embodiment, a sanity scan at a remote node 34 can be initiated from master node 32. In step 254, BBL 74 counts the number of users 38 at remote node 34 accessing licensed software 80. In one embodiment, BBL 74 counts user entries 134 during step 254. In another embodiment, each user counted in step 254 requires a software license to access licensed software 80. Thus, the number of counted users can equal the number of software licenses required to be allocated to the node.

At step 256, BBL 74 determines whether the sanity scan of step 252 was successful. If a full sanity scan was performed, then the sanity scan is deemed successful, and the method proceeds to step 260. At step 260, BBL 74 transmits a scan result message from remote node 34 to master node 32. If the sanity scan did not complete successfully (step 256), no scan result message is sent (step 258), and the method proceeds to step 262. In one embodiment, the sanity scan will be unsuccessful if the remote node 34 has become partitioned or has otherwise failed. At step 262, BBL 74 waits for a periodic sanity scan time interval before looping back to step 252 where another periodic sanity scan is performed.

Figure 11:
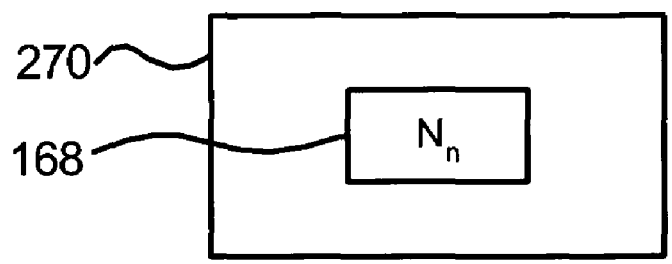
FIG. 11 is a block diagram of a sanity scan result message transmitted from a remote node in accordance with an embodiment of the present invention.
Figure 12:
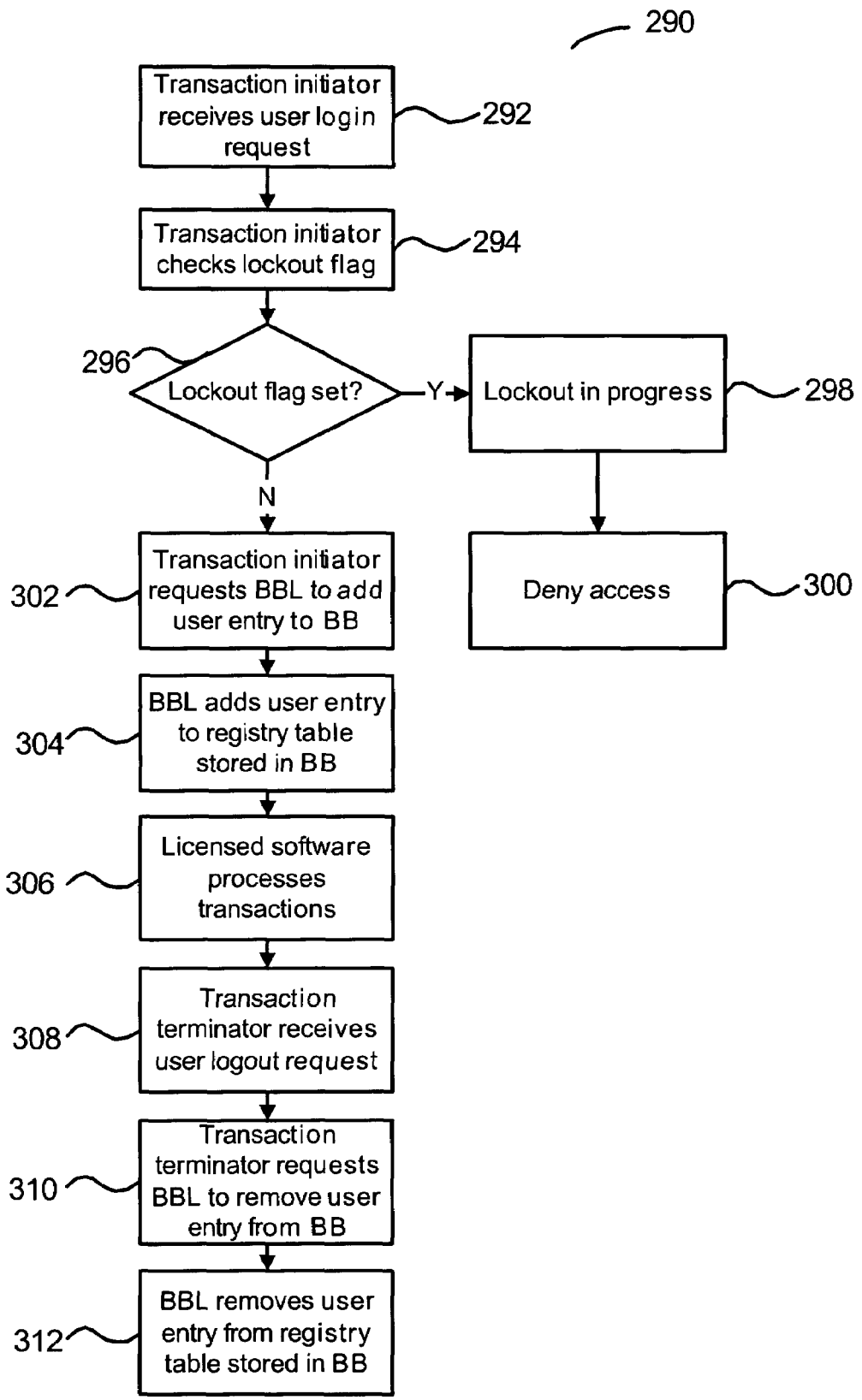
FIG. 12 is a flow chart describing a process for allocating and deallocating licenses to users of licensed software on a remote node.

FIG. 11 provides a block diagram 270 of a sanity scan result message transmitted in step 260 of FIG. 10. Scan result message 270 comprises $N_n$ 168 which is a count of users 38 accessing licensed software 80 on a remote node 34 obtained in step 254 of FIG. 10. In one embodiment, the opcode of scan result message 270 indicates that the sanity scan of step 252 of FIG. 10 was successful FIG. 12 provides a flow chart 290 describing a process for allocating and deallocating licenses to users 38 of licensed software 80. In one embodiment, the steps of FIG. 12 are performed by components of a remote node 34. At step 292, transaction initiator 76 receives a login request from a user 38. Transaction initiator 76 then checks lockout flag 136 stored in BB 72 (step 294). If the lockout flag 136 is set (step 296), BBL 74 recognizes that a license lockout is in progress (step 298). As a result, no license is allocated, and the user 38 is denied access (step 300).

If lockout flag 136 is not set (step 296), transaction initiator 76 requests BBL 74 to add a user entry 134 to registry table 132 of BB 72 (step 302). BBL 74 adds the user entry 134 in step 304. Thus, during the next execution of step 254 of FIG. 10, BBL 74 will count the newly added user entry 134 along with other user entries 134 previously entered. This results in one more software license being required by the node. At step 306, licensed software 80 processes transactions requested by the non-licensed user 38. After the user 38 has finished interacting with licensed software 80, transaction terminator 78 receives a user logout request from user 38 in step 308. In response to the logout request, transaction terminator 78 requests BBL 74 to remove the user entry 134 from registry table 132 (step 310). BBL 74 removes the user entry 134 at step 312. After the user entry 134 is removed, BBL 74 will not detect the user entry 134 during the next count of users in step 254 of FIG. 10. As a result, one less license is required by the node. The license previously allocated to user 38 is deallocated from the user, freeing the license to be allocated to other users.

Figure 13:
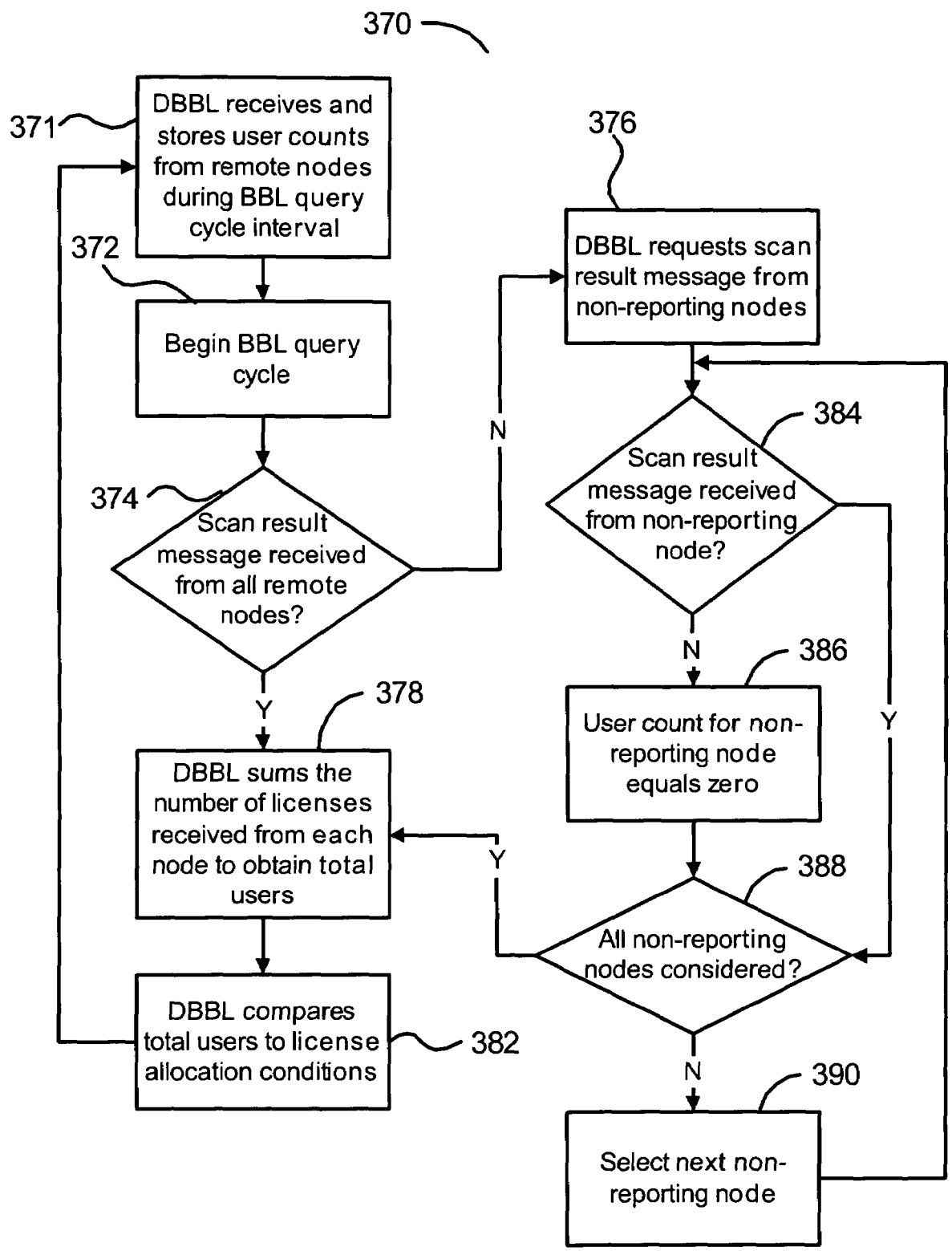
FIG. 13 is a flow chart describing a process for determining a total number of users of licensed software in a distributed computer network.

FIG. 13 provides a flow chart 370 describing a process for determining a number of total users. In one embodiment, the steps of FIG. 13 are performed by DBBL 104. At step 371, DBBL 104 receives and stores user counts 168 received with scan result messages 270 in DBB 102. At step 372, DBBL 104 begins a BBL query cycle. During the BBL query cycle, DBBL 104 determines whether a scan result message 270 has been received from all of remote nodes 34 since a previous BBL query cycle (step 374). If a scan result message 270 has been received from each of remote nodes 34, then the method proceeds to step 378. Otherwise, DBBL 104 proceeds to step 376.

If a scan result message 270 was not received from one or more remote nodes 34 in step 371, then DBBL 104 queries the non-reporting nodes, requesting a scan result message 270 (step 376). In steps 384, 386, and 388, DBBL 104 determines a user count 168 for each of the non-reporting nodes. It will be appreciated that DBBL 104 repeats steps 384, 386, and 388 for each non-reporting node. At step 384, DBBL 104 determines whether a scan result message 270 has been received from a first non-reporting node. If a scan result message not been received, then DBBL 104 assumes that the user count 168 for the non-reporting node equals zero users (step 386) and proceeds to step 388. On the other hand, if a scan result message 270 has been received from the node, then DBBL 104 will know the user count 168 of the node from the scan result message 270. DBBL 104 then proceeds to step 388. At step 388, if additional non-reporting nodes remain to be considered, then DBBL selects a next non-reporting node (step 390) and loops back to step 384. After all non-reporting nodes have been considered (step 388), then DBBL 104 will have a determined user count 168 for all nodes 34 of system 30. DBBL 104 then proceeds to step 378.

At step 378, DBBL 104 sums the user counts 168 in order to obtain the number of total users. In one embodiment, each user 38 included in the number of total users requires a single software license. Software licenses are automatically allocated to new users 38 once they log in to a remote node 34, are included in a user count 168 received by DBBL 104, and included in the number of total users. In one embodiment, individual software licenses are not associated with specific users 38. Rather, the total number of users determined in step 378 is a system-wide number of licenses required by all currently logged in users 38 of system 30. A license is deemed allocated when a user is included in the sum obtained in step 378.

Any nodes 34 from which a scan result message 270 was not received (step 371) will not have a user count 168 equal to zero as set in step 386. This effectively deallocates any software licenses formerly required by any previously counted users at nodes that have since failed. When a node fails, the number of total users will be lower than if user licenses on the failed node were included in summation step 378 (assuming at least one license was allocated to the failed node). With a lower number of total users, more licenses can be allocated to users of properly functioning nodes before the error 170, warning 172, or information thresholds 174 are met, as further described herein.

At step 382, DBBL 104 compares the number of total users to license allocation conditions as further described herein. In one embodiment, step 382 allows DBBL to determine whether too many user licenses have been allocated. DBBL 104 then loops back to step 371 where it resumes receiving and storing user counts before beginning another BBL query cycle upon the expiration of a BBL query cycle interval. In one embodiment, BBL query cycles are performed in five minute intervals. In another embodiment, BBL query cycles are performed at tunable intervals set by an administrator.

Figure 14:
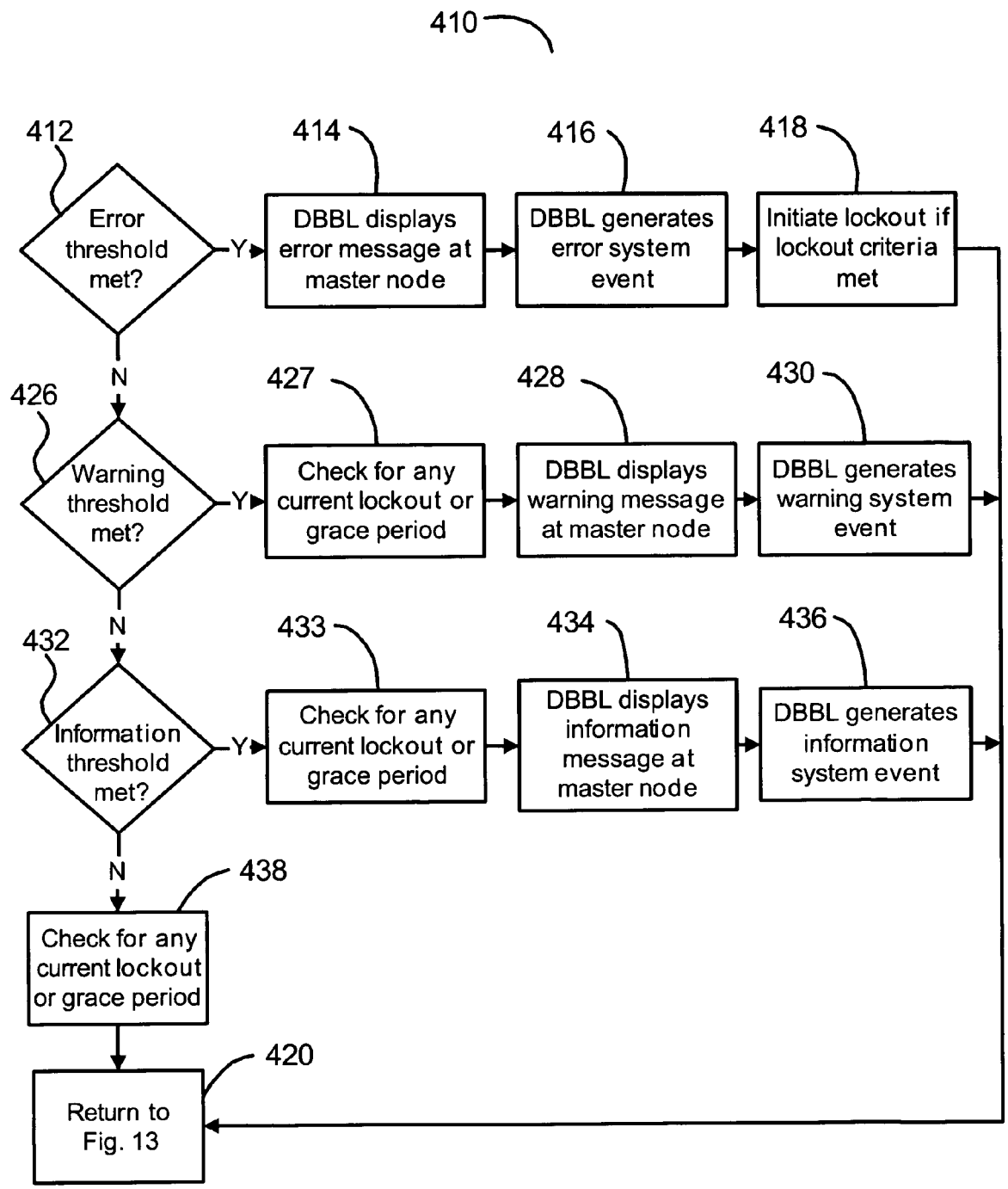
FIG. 14 is a flow chart describing a process for comparing a total number of allocated licenses with error, warning, and information conditions.

FIG. 14 provides a flow chart 410 describing a process for evaluating license allocation conditions and performing steps in response to license allocation results obtained from evaluations of the conditions. In one embodiment, the license allocation conditions are thresholds 170, 172, and 174. In another embodiment, the steps of FIG. 14 are performed by DBBL 104. In another embodiment, the method of FIG. 14 is called by step 382 of FIG. 13. At step 412, DBBL compares the number of total users obtained in step 378 of FIG. 13 with error threshold 170. In one embodiment, error threshold 170 is equal to 110 percent of total licenses 162. In another embodiment, error threshold 170 is 5 licenses greater than total licenses 162. If the error threshold 170 has been met, DBBL 104 displays an error message at master node 32 (step 414). In one embodiment, the error message is displayed in realtime and indicates that a license lockout is imminent. DBBL 104 then generates and transmits an error system event to all remote nodes 34 (step 416). In one embodiment, the error system event is a notification displayed on all remote nodes 34 in realtime containing the same information as the error message of step 414. At step 418, DBBL 104 evaluates lockout criteria to determine whether a license lockout will be initiated or is already in progress. If error threshold 170 is not met in step 412, then the method proceeds to step 426.

At step 426, DBBL 104 determines whether the number of total users equals or exceeds warning threshold 172. In one embodiment, warning threshold 172 equals the number of total licenses 162. If the warning threshold 172 has been met, DBBL 104 checks whether a license lockout or grace period is in effect (step 427). DBBL 104 then proceeds to step 428 where it displays a warning message at master node 32 (step 428). In one embodiment, the warning message is displayed in realtime and indicates that all licenses have been exhausted. DBBL 104 then generates and transmits a warning system event to all remote nodes 34 (step 430). In one embodiment, the warning system event is a notification displayed on all remote nodes 34 in realtime containing the same information as the warning message of step 428. If warning threshold 172 is not met in step 426, the method proceeds to step 432.

In step 432, DBBL 104 determines whether the number of total users equals or exceeds information threshold 174. In one embodiment, information threshold 174 is equal to ninety percent of total licenses 162. In another embodiment, information threshold 174 is one license less than the number of total licenses 162. If the information threshold 174 has been met, DBBL 104 checks whether a license lockout or grace period is in effect (step 433). DBBL 104 then proceeds to step 434 where it displays an information message at master node 32. In one embodiment, the information message is displayed in realtime and indicates that ninety percent of all available licenses have been exhausted. In another embodiment, the information message indicates that only five licenses are available for new users. DBBL 104 then generates and transmits an information system event to all of remote nodes 34 (step 436). In one embodiment, the information system event is a notification displayed on all remote nodes 34 in realtime containing the same information as the message of step 434. If information threshold 174 is not met in step 432, the method proceeds to step 438 where DBBL 104 checks whether a license lockout or grace period is in effect. The method then proceeds to step 420 where it returns to the process of FIG. 13.

It will be appreciated that steps 414, 428, and 434 can notify administrators of the number and/or proportion of total licenses 162 available to be allocated across nodes 32 and 34 of system 30. These notifications can put administrators on notice to take steps to increase the number of total licenses 162 and/or decrease the number of total users in order to prevent the initiation of a license lockout in accordance with the present invention.

Figure 15:
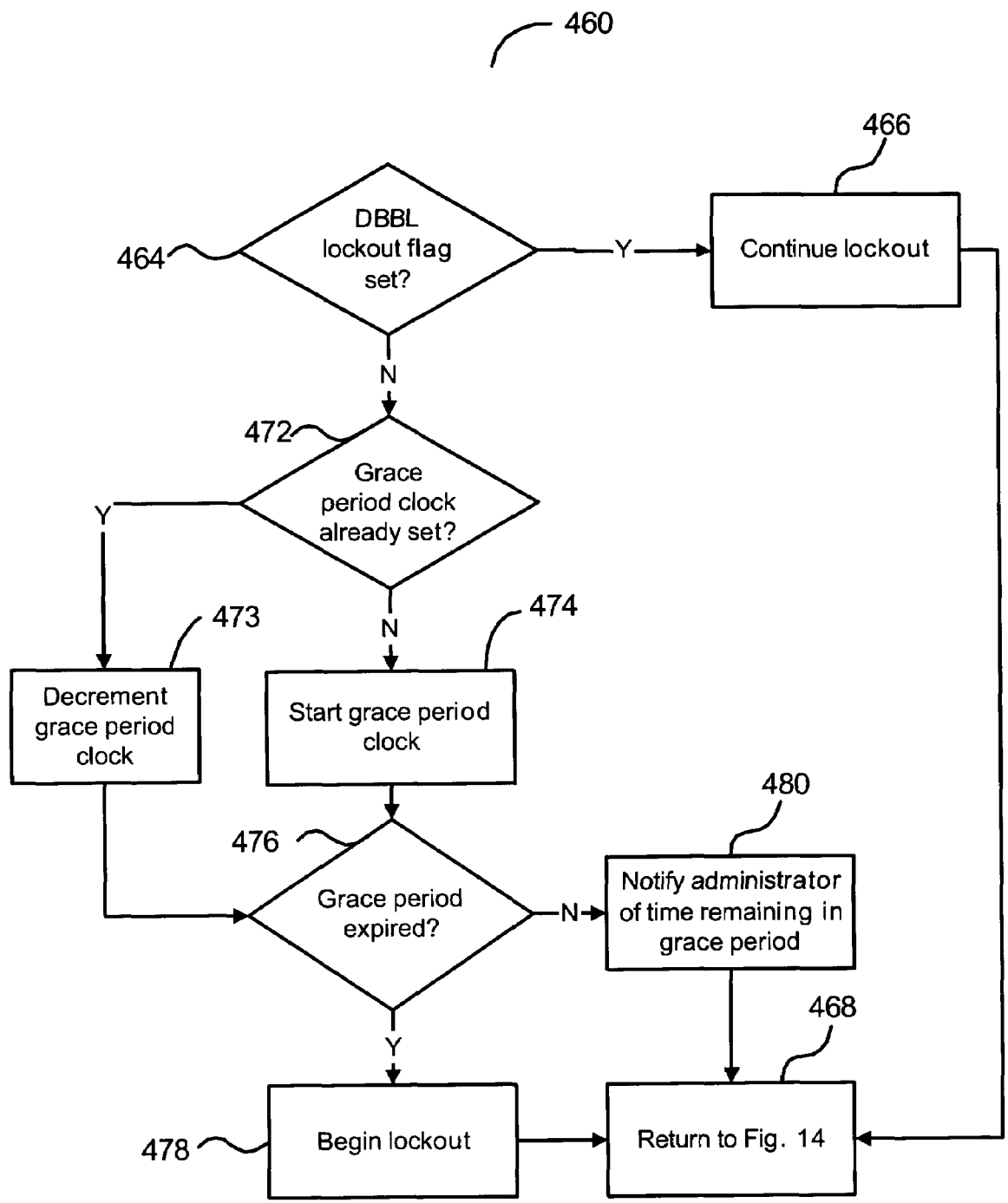
FIG. 15 is a flow chart describing a process for determining whether license lockout criteria are met.

FIG. 15 provides a flow chart 460 describing a process for determining whether license lockout criteria are met. In one embodiment, the steps of FIG. 15 are performed by DBBL 104. In another embodiment, the method of FIG. 15 is called by step 418 of FIG. 14. At step 464, DBBL 104 determines whether a lockout flag internal to the DBBL process 104 has been set. If so, a license lockout is already in progress and is allowed to continue (step 466). Otherwise, the method proceeds to step 472. At step 472, DBBL 104 checks whether grace period clock 108 has been set. In one embodiment, grace period clock 108 is set to the value of grace period 112 whenever error threshold 170 has been met in step 412 of FIG. 14. Grace period clock 108 measures a grace period during which software licenses can be allocated even though the number of total users has reached or exceeded the number of total licenses 162. In one embodiment, this grace period will run while grace period clock 108 is decremented. Once grace period clock 108 is decremented to a value less than or equal to zero, the grace period is tolled and a license lockout ensues. The grace period allows an administrator to purchase additional user licenses if necessary to prevent a license lockout, or take steps necessary to reduce the number of users 38, even if the notifications of steps 414, 428, or 434 of FIG. 14 were not heeded.

At step 472, DBBL 104 checks whether grace period clock 108 has already been set. If not, DBBL 104 starts grace period clock 108 (step 474) which triggers the start of the grace period. If grace period clock 108 has already been set (step 472), the grace period is already running. Accordingly, the grace period clock 108 is decremented in step 473 before the method proceeds to step 476. In step 476, DBBL 104 determines whether the grace period has expired. In one embodiment, if the value of grace period clock 108 is less than or equal to zero, the grace period is deemed to have expired, and DBBL 104 begins a license lockout (step 478), as further described herein. Otherwise, DBBL 104 notifies an administrator of the time remaining in the grace period (step 480) and the method returns to the process of FIG. 14.

Figure 16:
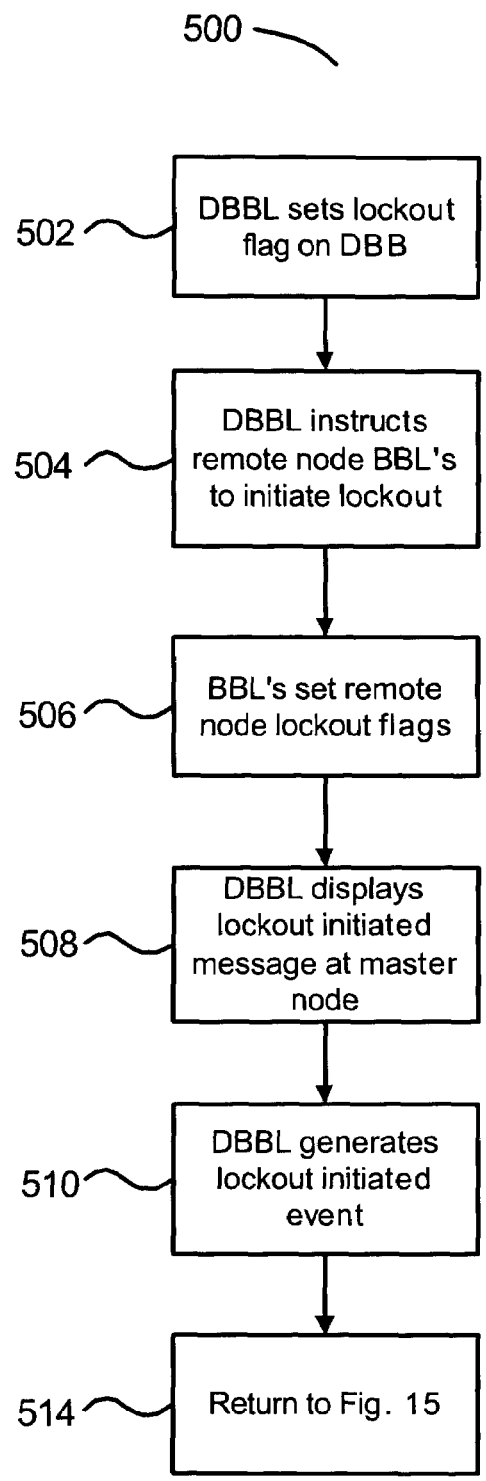
FIG. 16 is a flow chart describing a process for initiating a license lockout.

FIG. 16 provides a flow chart 500 describing a process for initiating a license lockout. In one embodiment, the steps of FIG. 16 are performed by DBBL 104 and BBL 74. In another embodiment, the method of FIG. 16 is called by step 478 of FIG. 15. At step 502, DBBL 104 sets a lockout flag stored by the DBBL process itself. DBBL 104 then instructs each BBL 74 of remote nodes 34 to initiate a license lockout (step 504). In response, each BBL 74 of remote nodes 34 sets the lockout flag 136 of each BB 72 (step 506). At step 508, DBBL 104 displays a "lockout initiated" message at master node 32. In one embodiment, the lockout initiated message displayed at master node 32 indicates that a license lockout has begun. At step 510, DBBL 104 generates a lockout initiated event that is transmitted to the remote nodes 34. At step 514, the method returns to the process of FIG. 15.

Figure 17:
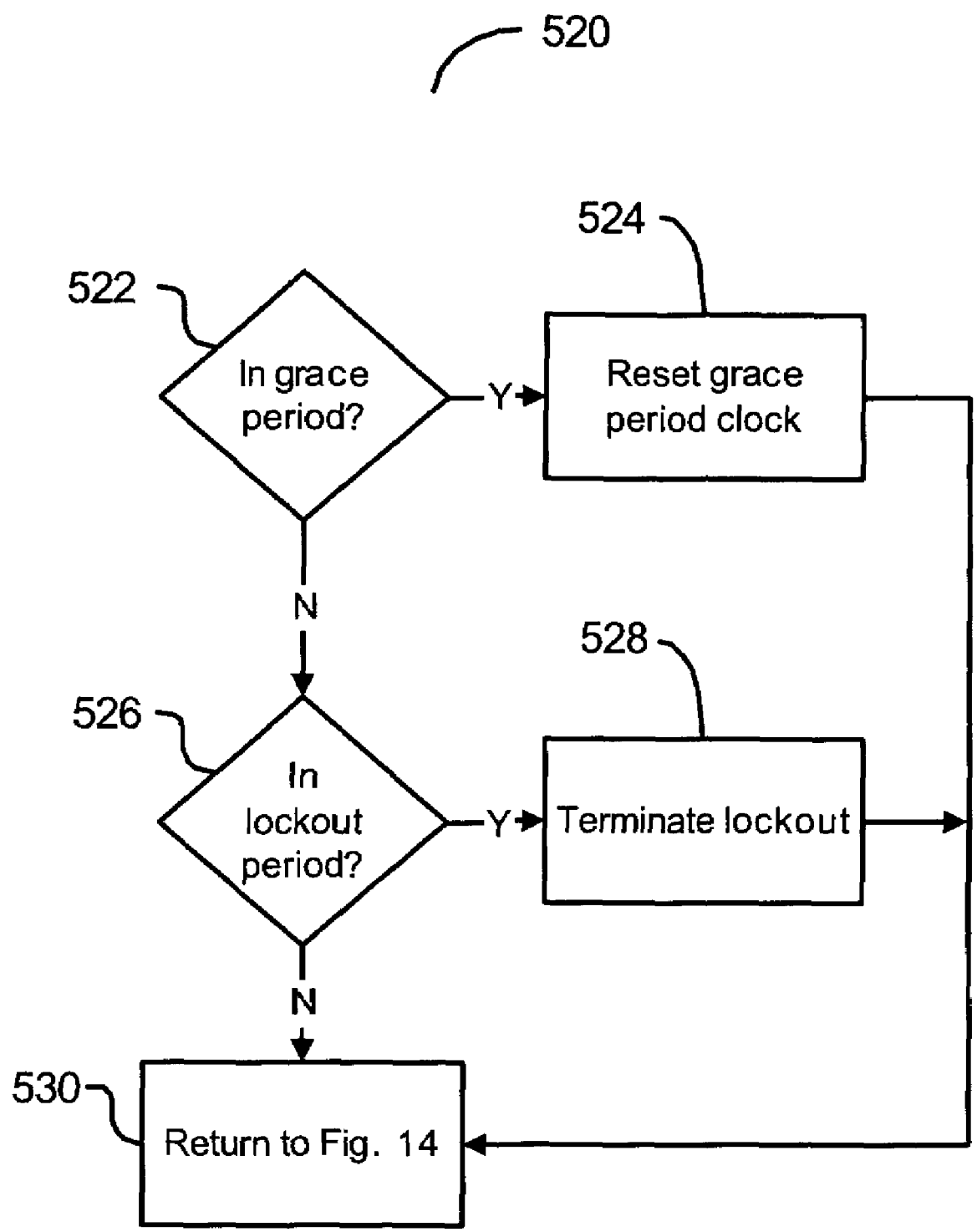
FIG. 17 is a flow chart describing a process for checking whether a grace period or license lockout is in progress.

FIG. 17 provides a flow chart 520 describing a process for checking whether a grace period or license lockout is in progress. In one embodiment, the steps of FIG. 17 are performed by DBBL 104. In another embodiment, the method of FIG. 17 is called by each of steps 427, 433, and 438 of FIG. 14. At step 522, DBBL 104 determines whether a grace period is in progress. In one embodiment, this is determined by checking the value of grace period clock 108. If the value of grace period clock 108 is greater than zero, then a grace period is assumed to be in progress. If so, DBBL 104 resets the grace period clock 108 in step 524, thus terminating the grace period. In one embodiment, this grace period clock 108 is reset to a null value. On the other hand, if the value of the grace period clock 108 found in step 522 is not greater than zero, then DBBL 104 determines that no grace period is in progress requiring termination. DBBL 104 then proceeds to step 526. At step 526, DBBL 104 determines whether a license lockout is currently in progress. In one embodiment, DBBL 104 checks a lockout flag internal to the DBBL process 104 in step 522. If the flag is set, a lockout is assumed to be in progress. In response, DBBL 104 terminates the license lockout (step 528), as further described herein. Otherwise, the method proceeds to step 530 where it returns to FIG. 14.

Figure 18:
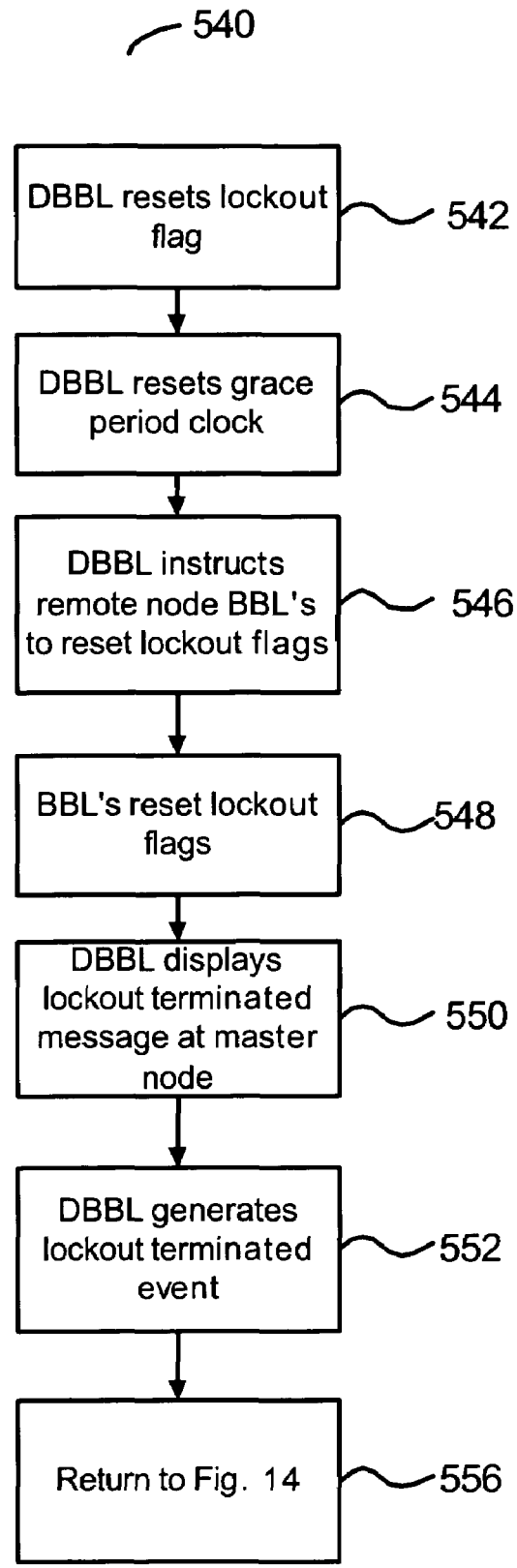
FIG. 18 is a flow chart describing a process for terminating a license lockout.

FIG. 18 provides a flow chart 540 describing a process for terminating a license lockout. In one embodiment, the steps of FIG. 18 are performed by DBBL 104. In another embodiment, the method of FIG. 18 is called by step 528 of FIG. 17. At step 542, DBBL 104 resets its internal lockout flag. DBBL 104 also resets grace period clock 108, thus allowing a new grace period to run if error threshold 170 is once again met (step 544). At step 546, DBBL 104 instructs each BBL 74 on remote nodes 34 to reset their lockout flags 136. In response, the lockout flags 136 are reset by the BBL's (step 548). At step 550, BBL 104 displays a "lockout terminated" message at master node 32. In one embodiment, the lockout terminated message indicates that a license lockout has ended. At step 552, DBBL 104 generates a lockout terminated event that is transmitted to the remote nodes 34. The method then returns to the process of FIG. 14 (step 556).

In one embodiment, all messages generated by DBBL 104 or displayed at master node 32 can be stored in one or more log files on system 30. In one embodiment, such a log file resides on master node 32. In yet another embodiment, events generated by DBBL 104 can trigger actions by application programs running on system 30.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A machine-implemented method for managing software licenses in a computer network having a maximum number of said licenses for use with a licensed software program, comprising the steps of:

counting numbers of said licensed software program in use at a plurality of nodes of said computer network to obtain counts of software licenses in use by each node;

performing a sanity scan on at least one subset of said plurality of nodes;

generating a scan result message;

transmitting said counts to a master node of said computer network;

said transmitting step transmits said scan result message with at least one of said counts;

calculating a total number of software users on said computer network, said calculating step uses said counts;

evaluating license allocation conditions using said total number of users;

wherein the license allocation conditions include an error threshold that results in a lockout initiation and a warning threshold that results in a warning message;

wherein the error threshold and warning threshold are values related to the maximum number of licenses;
wherein the error threshold is greater than the warning threshold; and
sending the warning message, using at least one processor, when the warning threshold is exceeded, and thereafter initiating a lockout when the error threshold is exceeded;
checking whether one of said scan result messages has been received from all of said nodes; and
deallocating any licenses allocated to users of any of said nodes from which a scan result message has not been received.

2. The method of claim 1, wherein:
at least one of the license allocation conditions is a threshold value,
the evaluating step compares said total users to said threshold value,
the condition is met if said total users is at least equal to said threshold.

3. The method of claim 1, wherein:
said evaluating step compares said total users to said maximum number of licenses,
said condition is met if said total users comprises at least a minimum percentage of said maximum number of licenses.

4. The method of claim 2, wherein said threshold is 110 percent of said maximum number of licenses.

5. The method of claim 2, wherein said threshold is 100 percent of said maximum number of licenses.

6. The method of claim 2, wherein said threshold is 90 percent of said maximum number of licenses.

7. The method of claim 2, wherein said threshold is at least 5 licenses greater than said maximum number of licenses.

8. The method of claim 2, wherein said threshold is at least equal to said maximum number of licenses.

9. The method of claim 1, wherein said transmitting step transmits said counts asynchronously.

10. The method of claim 1, further comprising the step of:
repeating said performing step periodically.

11. The method of claim 10, wherein said period is two minutes.

12. The method of claim 1, further comprising the step of:
repeating said calculating and evaluating steps periodically.

13. The method of claim 12, wherein said period is five minutes.

14. An apparatus comprising:
a memory that stores program code;
a processor in communication with said memory; wherein said program code, when executed by said processor, performs a method for managing software licenses in a computer network having a maximum number of said licenses for use with a licensed software program, the method comprising the steps of:
counting numbers of said licensed software program in use at a plurality of nodes of said computer network to obtain counts of software licenses in use by each node;
performing a sanity scan on at least one subset of said plurality of nodes;
generating a scan result message;
transmitting said counts to a master node of said computer network;
wherein said transmitting step transmits said scan result message with at least one of said counts;
calculating a total number of software users on said computer network, said calculating step uses said counts;
evaluating license allocation conditions using said total number of users;
wherein the license allocation conditions include an error threshold that results in a lockout initiation and a warning threshold that results in a warning message;
wherein the error threshold and warning threshold are values related to the maximum number of licenses;
wherein the error threshold is greater than the warning threshold; and
sending the warning message, using at least one processor, when the warning threshold is exceeded, and thereafter
initiating a lockout when the error threshold is exceeded;
checking whether one of said scan result messages has been received from all of said nodes; and
deallocating any licenses allocated to users of any of said nodes from which a scan result message has not been received.

15. The apparatus of claim 14, wherein:
at least one license allocation condition is a threshold value,
said evaluating step of said method compares said total users to said threshold value,
at least one license allocation condition is met if said total users is at least equal to said threshold.

16. The apparatus of claim 14, wherein said method further comprises the step of:
repeating said performing step periodically.

17. The apparatus of claim 14, wherein said method further comprises the step of:
repeating said calculating and evaluating steps periodically.

18. A processor readable storage medium, comprising:
processor readable program code embodied on said processor readable storage medium; wherein said processor readable program code, when executed by a processor, performs a method for managing software licenses in a computer network having a maximum number of said licenses for use with a licensed software program, the method comprising the steps of:
counting numbers of said licensed software program in use at a plurality of nodes of said computer network to obtain counts of software licenses in use by each node;
performing a sanity scan on at least one subset of said plurality of nodes;
generating a scan result message;
transmitting said counts to a master node of said computer network;
wherein said transmitting step transmits said scan result message with at least one of said counts;
calculating a total number of software users on said computer network, said calculating step uses said counts;
evaluating license allocation conditions using said total number of users;
wherein the license allocation conditions include an error threshold that results in a lockout initiation and a warning threshold that results in a warning message;
wherein the error threshold and warning threshold are values related to the maximum number of licenses;

wherein the error threshold is greater than the warning threshold; and sending the warning message, using at least one processor, when the warning threshold is exceeded, and thereafter initiating a lockout when the error threshold is exceeded;

checking whether one of said scan result messages has been received from all of said nodes; and deallocating any licenses allocated to users of any of said nodes from which a scan result message has not been received.

19. The processor readable storage medium of claim 18, wherein:

at least one license allocation condition is a threshold value, said evaluating step of said method compares said total users to said threshold value, at least one license allocation condition is met if said total users is at least equal to said threshold.

20. The processor readable storage medium of claim 18, wherein said method further comprises the step of:

repeating said performing step periodically.

21. The processor readable storage medium of claim 18, wherein said method further comprises the step of:

repeating said calculating and evaluating steps periodically.

22. The machine-implemented method of claim 1, wherein the lockout initiation staffs a grace period clock.

23. The machine-implemented method of claim 22, wherein the lockout occurs after the grace period ends.

24. The method of claim 1; wherein the license allocation conditions further include an information threshold which is less than the warning threshold;

wherein when the information threshold is exceeded, an informational message is sent.

25. The apparatus of claim 14; wherein the license allocation conditions further include an information threshold which is less than the warning threshold;

wherein when the information threshold is exceeded, an informational message is sent.

26. The processor readable storage medium of claim 18; wherein the license allocation conditions further include an information threshold which is less than the warning threshold;

wherein when the information threshold is exceeded, an informational message is sent.

* * * * *

UNITED STATES PATENT AND TRADEMARK OFFICE
CERTIFICATE OF CORRECTION

PATENT NO. : 7,536,356 B2  Page 1 of 1
APPLICATION NO. : 10/973226
DATED : May 19, 2009
INVENTOR(S) : May D. Eng It is certified that error appears in the above-identified patent and that said Letters Patent is hereby corrected as shown below:

In column 8, line 37, after "successful" insert -- . --.

In column 16, line 4, in claim 22, delete "staffs" and insert -- starts --, therefor.

Signed and Sealed this

First Day of June, 2010

David J. Kappos
*Director of the United States Patent and Trademark Office*